United States Patent [19]

Clark

[11] Patent Number: 4,535,902

[45] Date of Patent: Aug. 20, 1985

[54] INTERMEDIATE ARTICLE OF MANUFACTURE FOR A PLASTIC CONTAINER

[75] Inventor: Richard E. Clark, Merrimack, N.H.

[73] Assignee: Continental Packaging Company, Inc., Stamford, Conn.

[21] Appl. No.: 423,358

[22] Filed: Sep. 24, 1982

Related U.S. Application Data

[63] Continuation-in-part of Ser. No. 364,563, Apr. 1, 1982.

[51] Int. Cl.³ .................. B65D 1/22; B29D 23/03; B29C 17/08
[52] U.S. Cl. .................................. 215/1 C; 150/55; 264/527; 264/536; 428/35
[58] Field of Search .................. 215/1 C; 220/62; 264/159, 527, 536, 532; 150/55; 428/35, 542.8; 425/522, 538

[56] References Cited

U.S. PATENT DOCUMENTS 3,162,707 12/1964 Scott, Jr. et al. .................. 264/527
3,310,620 3/1967 Martelli et al. .................. 264/538
3,525,123 8/1970 Clines et al. .................. 264/527 X
3,793,421 2/1974 Paubandt .................. 264/527

FOREIGN PATENT DOCUMENTS 3110078 12/1981 Fed. Rep. of Germany ........ 428/35

Primary Examiner—William Price
Assistant Examiner—Sue A. Weaver
Attorney, Agent, or Firm—Charles E. Brown

[57] ABSTRACT

This relates to the blow molding of containers wherein the containers are formed of biaxially oriented plastic material. A multi-sided hollow member is blown within a convention blow mold using a conventional type of preform. Each side, when severed from the top and bottom of the hollow member and from each other forms a tray or box like container having a bottom, side walls and a peripheral sealing flange. The efficiency of the container from a weight to capacity standpoint is at a maximum due to the biaxial orientation of the plastic material.

7 Claims, 5 Drawing Figures

INTERMEDIATE ARTICLE OF MANUFACTURE FOR A PLASTIC CONTAINER

This application is a continuation-in-part of my co-pending earlier application Ser. No. 364,563 filed Apr. 1, 1982.

This invention relates in general to new and useful improvements in plastic containers, and more particularly to a plastic container wherein the container is formed of a plastic material which is biaxially oriented and wherein the entire container has a degree of biaxial orientation.

Most particularly, this invention relates to a container which includes a bottom and side walls and normally a peripheral sealing flange and wherein a plurality of such containers are simultaneously formed in a blow mold from a conventional type of preform. While the preferred plastic material is PET, it is to be understood that other biaxially orientable plastic materials may be utilized depending upon the approval of that material for use as containers for foods or the particular use of such container.

In accordance with this invention, there is provided a multi-sided blow mold cavity in which a tubular preform is positioned and thereafter blow molded so as to form a hollow member with a plurality of sides and wherein each side, when separated from the bottom and top of the hollow member forms a container having a peripheral flange.

With the foregoing method, it will be seen that all walls of the container, including the bottom wall and the peripheral sealing flange, will biaxially oriented so as to have maximum strength for material weight.

With the above and other objects in view that will hereinafter appear, the nature of the invention will be more clearly understood by reference to the following detailed description, the appended claims, and the several views illustrated in the accompanying drawings.

Figure 1:
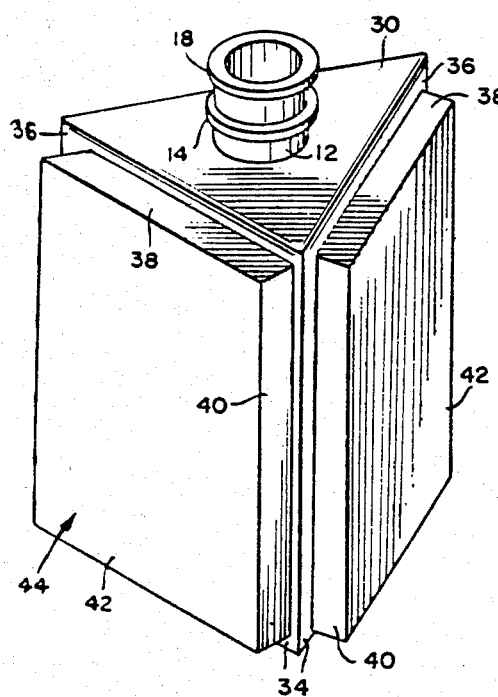
FIG. 1 is a top perspective view of a hollow blown article formed in accordance with this invention wherein each side of the article is in the form of a container.
Figure 2:
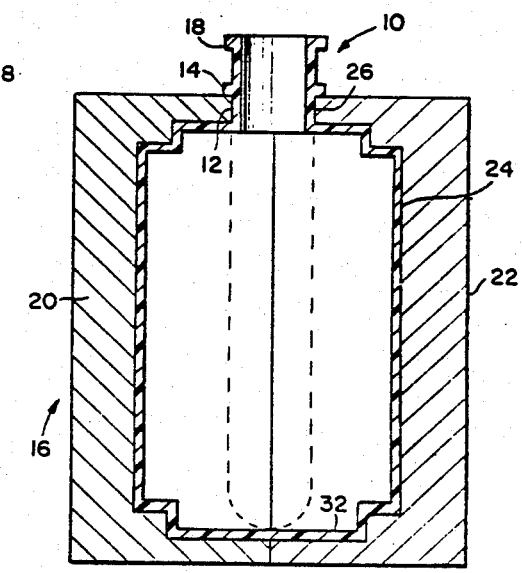
FIG. 2 is a transverse sectional view taken through a conventional blow mold and shows the article of FIG. 1 in the blow mold.

In accordance with this invention, there is provided a tubular preform 10 of the conventional type. The preform 10 may be of circular cross-section or it may be a specially formed preform. In any event, it has a tubular portion 12 which includes a lower shoulder 14 for engagement with the top of a mold, such as mold 16, and an upper shoulder 18 to facilitate handling of the preform and the presentation thereof into the mold 16.

The mold 16 is of a split construction including halves 20, 22 and is provided with a cavity 24 which includes a tubular upper portion 26 which generally fits the tubular upper portion of the preform 10. The cavity of the mold 16 is generally triangular in cross-section so as to form a blow molded member, such as that shown in FIG. 1, the blow molded member being generally identified by the numeral 28.

The blow molded member 28, depending upon the product to which it is to be packaged in results in containers, may be formed of PET or similar biaxially orientable plastic materials. The hollow member 28 includes a top wall 30 having extending upwardly therefrom the preform tubular neck 12 from which the shoulders 14 and 18 project. The hollow member 28 also includes a bottom wall 32. The top wall 30 and the bottom wall 32 in the illustrated member 28 are triangular in outline. As a result, the member 28 is provided with three sides 34.

Each of the sides 34, in the preferred embodiment of the invention, is generally rectangular and includes a peripheral base portion 36 which are joined together and to the top wall 32 and the bottom wall 34. The base portion 36 has projecting generally radially outwardly therefrom four side walls 38 and 40 which, in the illustrated embodiment of the member 28, are arranged in rectilinear pattern. The walls 38, 40 are further joined by an outer wall 42.

Figure 3:
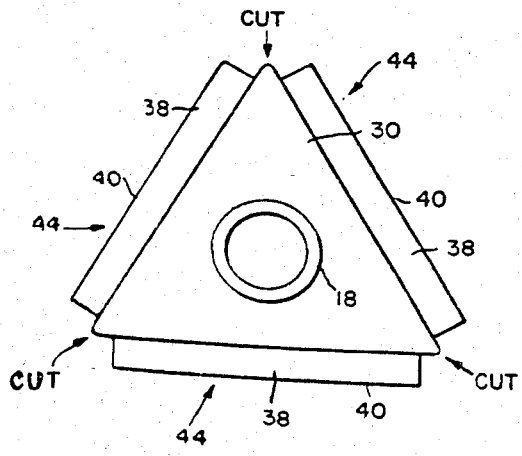
FIG. 3 is a top plan view of the article of FIG. 1 and shows further the arrangement of the containers and the manner in which they are separated from the top and bottom of the hollow member and from each other.

It is to be understood that each of the sides 34 forms a container and the three containers of the hollow member 28 are formed by cutting the top wall 30 and the bottom wall 32 from the tubular member. Then, as shown in FIG. 3, the sides 34 are separated from one another along their lines of juncture by separate cuts. The net result is for each of the side walls 34 there is a rectangular tray like container which is generally identified by the numeral 44. Each container 44 has a bottom wall formed by the wall 42, upstanding side walls formed by walls 38, 40 and a peripheral flange formed by the base 36. The peripheral flange 36 may, of course, have sealed thereto a cover for the container 44, the cover not being shown and forming no part of this invention.

Figure 4:
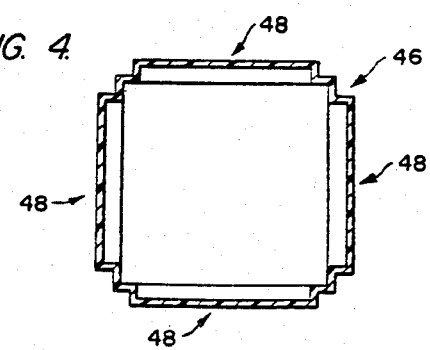
FIG. 4 is a horizontal sectional view taken through a modified form of the hollow member formed in accordance with this invention.

Referring now to FIG. 4, it will be seen that in lieu of the hollow member 28 being of a triangular cross-section so as to form only three containers 44, there may be a hollow member configuration which is four-sided, as shown in FIG. 4, the hollow member being identified by the numeral 46. The four individual containers 48 formed by the four sides of the member 46 may be of the same size as the container 44 or may be differ in size as desired.

Figure 5:
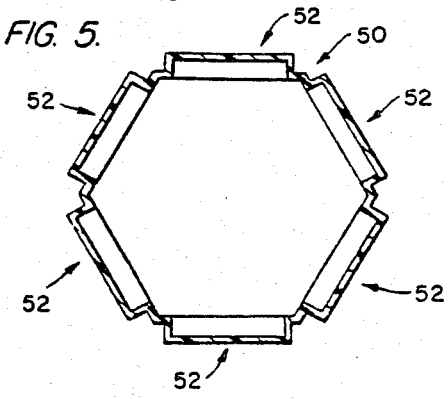
FIG. 5 is a horizontal sectional view taken through still another form of hollow member formed in accordance with this invention.

In a like manner, the number of sides of the hollow member formed by blow molding may be increased to six as shown with respect to the hollow member 50 of FIG. 5. Once again each side of the resultant hollow member will be in the form of a container 52.

It is to be understood that the most economical cross-section of a hollow member blow molded in accordance with this invention will be that of a regular polygram where all of the sides are of the same size.

Although only a preferred embodiment of the invention has been specifically illustrated and described herein, it is to be understood that minor variations may made in the container construction and the method of forming the same without departing from the spirit or scope of the invention as defined by the appended claims.

I claim:

1. An intermediate article of manufacture conprising a blow molded hollow shape formed of an orientable plastic material and having top and bottom walls joined by a plurality of sides in excess of two, a hollow neck extending from said top wall, and each of said sides having extending therefrom a projection, each projection being in the form of a container including a bottom wall and a side wall arrangement, said side wall arrangement including an edge remote from said container bottom side wall and integrally joined to the respective one of said sides.

2. An intermediate article of manufacture according to claim 1 wherein said top and bottom walls are essentially flat.

3. An intermediate article of manufacture according to claim 1 wherein said plastic material of said sides and said containers being biaxially oriented.

4. An intermediate article of manufacture according to claim 1 wherein said plastic material of said sides and said containers are biaxially oriented, and said hollow neck being free of orientation.

5. An intermediate article of manufacture according to claim 1 wherein said top and bottom walls are essentially flat and of a regular planar geometric configuration.

6. An intermediate article of manufacture according to claim 1 wherein that portion of each side from which a respective projection extends in part forms a peripheral flange on the respective container.

7. An intermediate article of manufacture according to claim 1 wherein that portion of each side from which a respective projection extends forms a peripheral flange on the respective container and said blow molded shape top and bottom walls form the only waste material.

* * * * *